United States Patent [19]
Parsons

[11] Patent Number: 5,339,498
[45] Date of Patent: Aug. 23, 1994

[54] ADJUSTABLE TYER

[76] Inventor: Llewellyn B. Parsons, 113 Cook Street, Barrie, Ontario, Canada, L4M 4G5

[21] Appl. No.: 127,607

[22] Filed: Sep. 28, 1993

[51] Int. Cl.⁵ .............................................. F16G 11/00
[52] U.S. Cl. .............................. 24/129 R; 24/115 M; 24/130
[58] Field of Search ............ 24/129 R, 129 A, 129 W, 24/130, 115 H, 115 M; 410/98, 108, 109, 110

[56] References Cited

U.S. PATENT DOCUMENTS

| | | | |
|---|---|---|---|
| 208,483 | 10/1978 | Morgan | 24/129 R |
| 521,847 | 6/1894 | Christensen | 24/130 |
| 2,316,950 | 4/1943 | Goeller | 24/129 R |
| 2,592,696 | 4/1952 | Hoody | 24/129 R |
| 2,902,736 | 9/1959 | Hampe | 24/115 M |
| 3,321,816 | 5/1967 | Monroe | 24/130 |
| 4,414,712 | 11/1983 | Beggins | 24/129 R |
| 4,930,193 | 6/1990 | Baker | 24/129 R |
| 5,020,192 | 6/1991 | Gerlach | 24/129 R |
| 5,033,169 | 7/1991 | Bindon | 24/129 R |

*Primary Examiner*—Victor N. Sakran
*Attorney, Agent, or Firm*—Jane Parsons

[57] ABSTRACT

An adjustable tyer is formed using no knots. A slide, possibly made of plastics material is provided. The slide has a pair of channels through it for rope. A bight of rope is formed at one end of the slide. Anchoring means are provided to anchor the rope so that it is fixed against sliding in at least one of the channels. When rope is fixed with respect to only one channel a slip noose is formed. When rope is fixed with respect to both channels a tyer of fixed length is provided. The anchoring means to fix rope in respect of the second channel is releasable for adjustment purposes.

7 Claims, 9 Drawing Sheets

ADJUSTABLE TYER

BACKGROUND OF THE INVENTION

1. Field of the Invention

This invention relates to a tyer of adjustable length in which no knots are involved. Such tyers are useful in attaching one object to another fixed object such as for mooring a boat or for use in guy ropes for example for tents.

2. Acknowledgement of Prior Art

Traditionally ropes forming tyers for various purposes such as mooring ties, awning or tarpaulin tie downs, tent guy ropes, rope slings for rock climbing, etc., have been formed using a variety of sophisticated knots. It was, at one time, necessary for a person participating in certain sports or jobs to have an extensive knowledge and skill in tying knot suitable for particular purposes. Such knowledge and skill took considerable time to acquire. In so far as industry is concerned, the learning time may be regarded as nonproductive. In so far as recreation and sport are concerned, the learning time was sometimes ignored by some participants who, due to lack of such knowledge and skill, stood at risk of putting themselves or their equipment into danger.

Knots which are of particular importance in many sports are the slip knot, the bowline and knots about a length of rope which are tight and fixed in position under tension but which slide when not under tension. The slip knot is used for making adjustable nooses which may be reduced in size to tighten about an object if slipped in one direction and which may be enlarged if slipped in the other direction. A bowline is a fixed knot which does not slip- Various knots are used for the purpose of slipping when not under tension and being fixed when under tension.

Due to the problems involved in the art of knot tying, efforts have been made to provide easy-to-use gadgets attachable to ropes to replace knots in some fields. For example, the turnbuckle is a conventional means of tightening a guy rope. Various other means of tightening guy ropes are known, many of them involving loops of rope which are adjustable in length by means of slides which have one position in which they are slidable and another position in which they are position in which they are fixed.

Examples of gadgets which replace knots for various purposes are described and claimed in U.S. Pat. Nos. 2,316,950 issued Apr. 20, 1943 to Goeller for TENSION ADJUSTER FOR CLOTHES LINES OR THE LIKE;

2,932,072 issued Apr. 12, 1960 to Pruchnow for ONE PIECE CORD HOLDER;

2,506,274 issued May 2, 1950 to G. C. Maxwell et. al. for ROPE FASTENING DEVICE;

4,105,349 issued Aug. 8, 1978 to Kupperman et. al. for MECHANISM FOR FORMING A LOOP IN A ROPE OR THE LIKE;

4,976,013 issued Dec. 11, 1990 to Wax for ROPE-TYING DEVICE AND METHOD;

4,414,712 issued Nov. 15, 1983 to Beggins for LINE FASTENING DEVICE; and 5,020,192 issued Jun. 4, 1991 to Gerlach for ADJUSTABLE TIE DOWN APPARATUS AND METHOD.

These referenced U.S. patents are exemplary of many devices which have been proposed to reduce the need for knot tying.

Although a very great number of such devices have been proposed the need remains for a simple, inexpensive, multi-purpose device to alleviate the need for knot tying. Such a device should not only be extremely simple to use but should be quick to use in either fastening or unfastening. At the very least it should be quicker to use the device than to tie a knot. The present inventor had addressed this problem.

SUMMARY OF THE INVENTION

According to the invention there is provided an adjustable tyer comprising a flexible rope and a slide adjustably positionable with respect to the rope to adjust the effective rope length. The slide comprises a unitary body having a first tube portion through which the rope passes, an upstream portion of rope leading into an upstream tube end and a downstream first bight of rope emerging from a downstream tube end. Clamp means act on a returning downstream length of said first bight. Holding means are provided for a downstream end portion of the rope downstream of the anchor means. The rope may be freely slidable in the first tube portion whereby the length of the first bight is freely adjustable and thus the tyer emulates a tyer having a slip knot. Alternatively the tyer may include jamming means to inhibit sliding of the rope in the first tube whereby the length of the first bight is settable. In this case the tyer may emulate a tyer having a knot which is slidable when not under tension but fixed when under tension.

The tyer having a slide emulating a slip knot may have the rope confined in parallel channels of the slide in fortuous form of general S configuration, one bight of the S being an attachment loop for attachment of the rope to an object and the other bight of the S being tightenable in a clamp of the slide upon tension on the rope.

A rope guide may be provided for the returning downstream length of said first bight upstream of the clamp means to form a second bight of rope between the rope guide and the holding means and the clamp means acts on the second bight of rope. The rope guide may be a second tube portion parallel to the first tube portion, the rope passing through the first tube portion in one direction and the returning downstream length of rope passing through the second tube portion in the opposite direction. The rope guide may be a quick release means comprises a longitudinal channel parallel to the first and second tube portions and having a longitudinal mouth for removable insertion of upstream length of said end portion of the rope tightly thereinto. The upstream length passes through the longitudinal channel in said one direction.

The clamp means may be a V-shaped slot located between the longitudinal channel and the second tube portion to engage the second bight and progressively wedge it in the V on a tensioning of the upstream portion of the rope. Preferably the V-shaped slot has sharpish inner edges to grip the rope and is shaped and positioned so that increasing tension progressively forces the rope more deeply into the slot for increased grip.

For the alternative tyer in which the slide is fixed under tension but slidable when not under tension, releasable jamming means may be provided to inhibit sliding of the rope in the first tube whereby the length of the bight is settable. The jamming means comprises a longitudinal slot opening into said first tubular portion, a third bight of rope extending slightly from said slot, and said returning downstream length of the first bight passing between the slide body and the third bight, whereby tightening of the third bight jams the rope against sliding in the first tube portion. Again, the holding means may be quick release means comprising an elongate channel parallel to the first tube portion and having a longitudinal mouth for removable insertion of an upstream length of said end portion of the rope tightly thereinto. Rope passes through the first tube portion in one direction and said upstream length passes through the longitudinal channel in said one direction, to form a second bight of rope between jamming means and the second tube portion.

Again, the clamp means may be a V-shaped slot, the apex of the V pointing in said one direction, located between the jamming means and the longitudinal channel to engage the second bight and progressively wedge it in the V on tensioning of the first bight. As in the previous alternative the V shaped slot preferably has sharpish inner edges to grip the rope and is shaped and positioned so that increasing tension progressively forces the rope more deeply into the slot for increased grip. In another embodiment, the clamping means may be jamming means comprising a longitudinal slot opening into said first tubular portion, a third bight of rope extending slightly from said slot, and said returning downstream length of the first bight passing between the slide body and the third bight, whereby tightening of the third bight jams the rope against sliding in the first tube portion. In this latter case, the holding means comprises an elongate keyhole channel parallel to the first tube portion and having a longitudinal mouth, and the rope having a key slide at a downstream end of the end portion fitting into the elongate slot.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
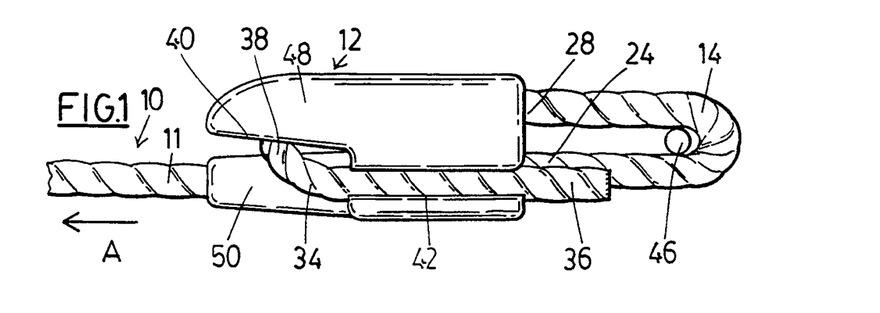
FIG. 1 shows an embodiment of a tyer according to the invention from one side.
Figure 2:
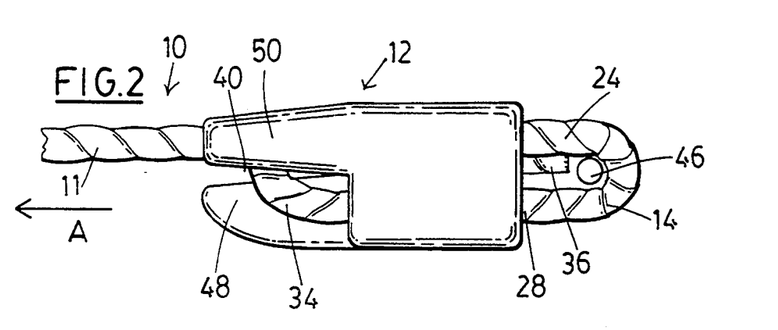
FIG. 2 shows the tyer of FIG. 1 from the other side.
Figure 3:
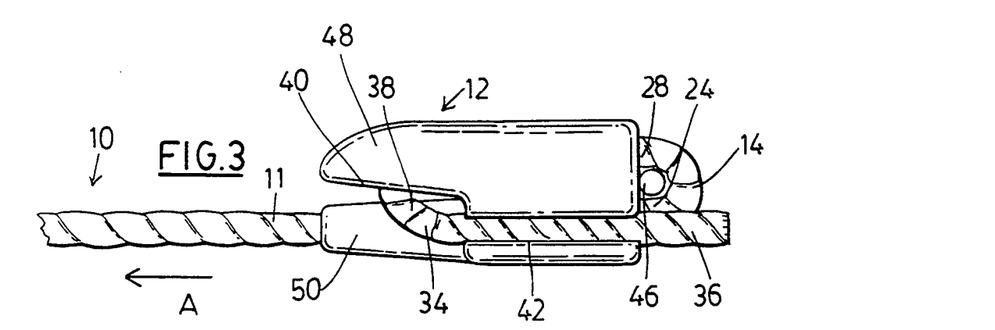
FIG. 3 shows a view of the embodiment of FIG. 1 from the same side as that of FIG. 1 in tightened condition.
Figure 4:
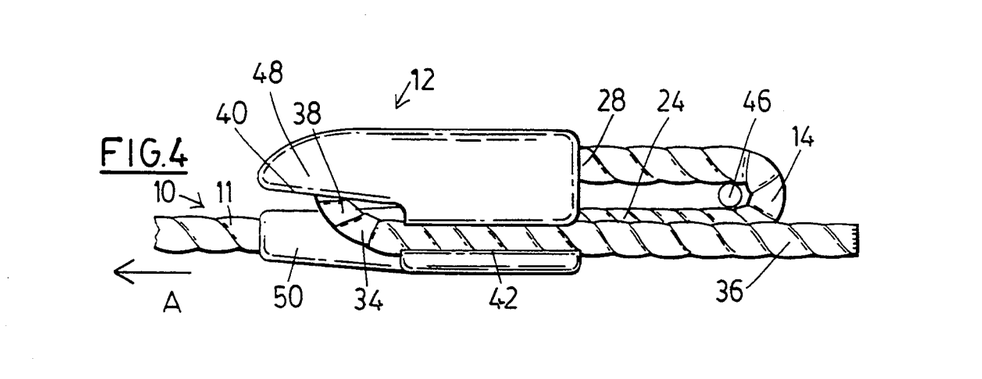
FIG. 4 is another view of the tyer of FIG. 1 having an adjusted length.
Figure 5:
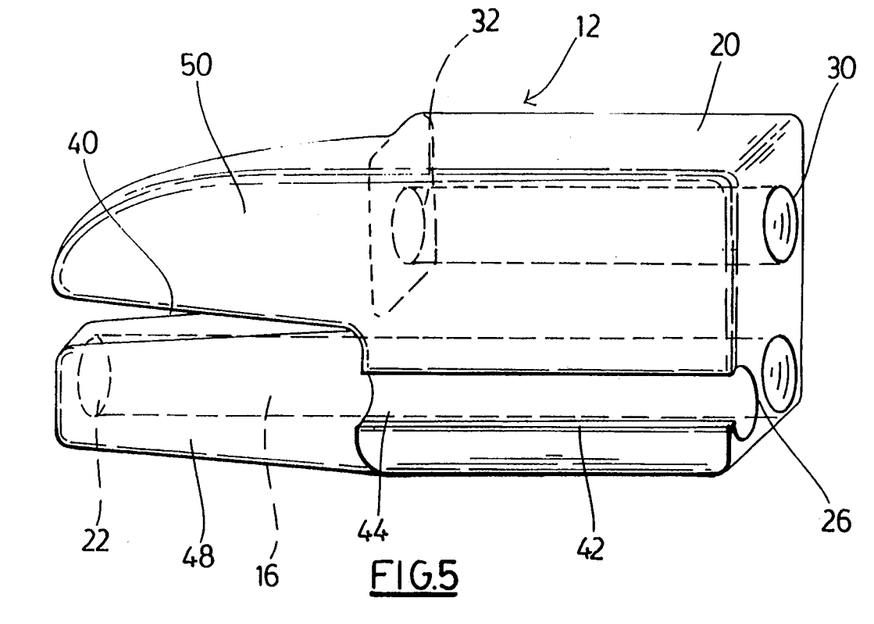
FIG. 5 is a perspective view of the slide (without rope) of FIGS 1-4.
Figure 6:
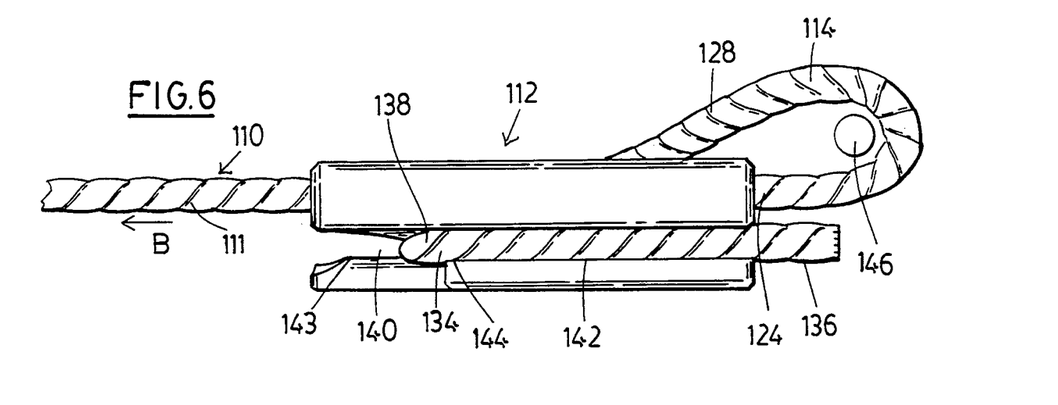
FIG. 6 is a view of another embodiment of a tyer according to the invention.
Figure 7:
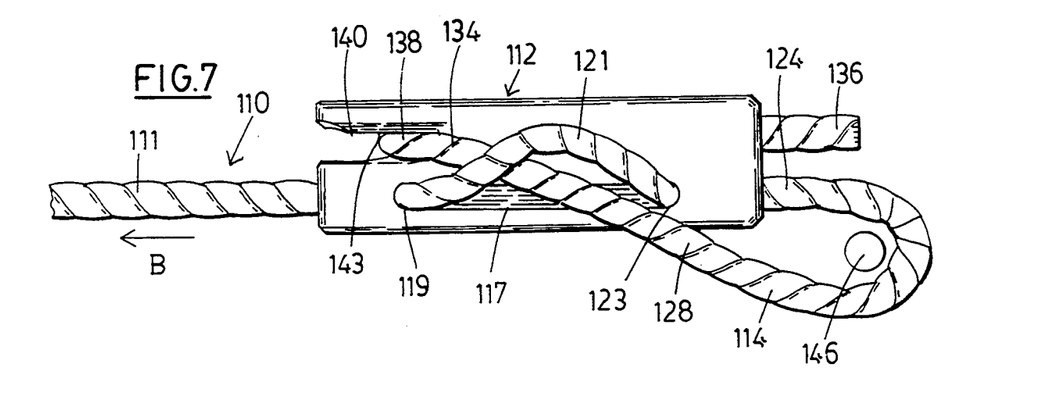
FIG. 7 is a view of the embodiment of the tyer according to FIG. 6 as seen from the other side in untensioned condition.

FIGS. 1 to 4 illustrate a tyer comprising a rope 10 and slide 12. FIG. 5 illustrates the slide of FIGS. 1 to 4. The rope is configured in the slide to have a first bight 14 which forms a fully adjustable noose. Thus, the embodiment of FIGS. 1 to 4 emulates a rope looped back on itself and having a slip knot to form a freely adjustable noose, which can tighten around an object 46 by reducing the length of the noose but which can not be locked at a set length.

The slide 12 comprises a unitary body of very general rectangular configuration having a first tube portion 16 running in a longitudinal direction through it. A second tube portion 18 runs parallel to tube portion 16 opening at either end of a longitudinally arranged integral buttress 20.

The rope 10 passes through the tube portion 16 from an upstream end 22 to emerge, as a downstream portion 24, from downstream end 26 of first tube portion 16. A return run of rope 28 enters end 30 of second tube portion 18 and emerges as mid portion 34 at the other end 32 of tube portion 18. Thus, the first bight 14 of rope exists between end 26 of first tube portion 16 and end 30 of second tube portion 18.

The mid portion 34 of rope emerging from end 32 of second tube portion 18 is bent over to form a second bight 38 of rope. This second bight 38 passes through V-shaped clamping slot 40 which is dimensioned to exert gripping action on the rope as it is drawn towards the apex of the V. The mid portion 34 of the rope is then latched into a keyhole slot 42 of slide 12 which lies parallel to first tube portion 16 and second tube portion 18. Thus, the mid portion 34 of the rope runs in the same direction as an upstream portion 11 of the rope which passes through the keyhole slot 42 which is contoured to fit around the end portion 36 of the rope. An end portion of rope 36 emerges at keyhole slot 42 has a longitudinal mouth 44 which is dimensioned so that mid portion 34 of the rope can be forced into the slot through the mouth but is not so large that mid portion 34 easily disengages from keyhole slot 42 under its own stresses.

The first bight 14 may be located around a fixed object such as a post 46 to which it is desired to tether a moveable object.

In operation the tyer functions in the following manner. A length of rope is pulled through first tube portion 16 and located around post 46. The return run 28 of rope passes through second tube portion 18 and second bight 38 of rope is lodged in V slot 40. Initially, lodgement of second bight 38 of rope in V slot 40 may be a loose lodgement. The mid portion 34 is bent over and latched into keyslot 42 to anchor the end 36 of the rope. If the moveable object tends to pull the rope 10 in the direction of arrow A. The rope will be pulled through first tube portion 16 to reduce the size of bight 14 and pull the slide 12 towards post 46. As tension increases on the rope the bight 38 will be forced more deeply into clamping V-slot 40 which exerts gripping or clamping action on it and prevents detachment of the rope 10 from the slide 12. The bentover mid portion 34 lodged in keyhole slot 42 may add additional frictional drag inhibiting withdrawal of the rope 10 from the slide 12. Indeed, in the initial tightening motion of the slide 12, the second bight 38 of rope may not be lodged deeply in V slot 40 and it may be the frictional drag due to the bent over mid portion 34 lodging in keyhole slot 44 which permits drawing of bight 38 more deeply into V slot 40. If further insurance against withdrawal of the rope 10 of the slide 12 is desired it is possible to thread the end portion 36 through bight 34.

If it is desired to shorten the length of the tyer, the slide 12 located further upstream along an upstream portion 11 of rope 10. Thus, a longer end portion 36 will be attained. This is best seen in FIG. 4. If, on the other hand, it is desired to lengthen the tyer the slide 12 may be moved in the other direction.

V-slot 40 may be of any suitable dimension to exert clamping action on the bight 38 of rope passing through it. However, as may be seen from FIG. 5, V slot 40 is conveniently formed by offset legs 48, 50 of slide 12. The offset legs may be diagonally located with respect to the slide end and may have sharp longitudinal corners forming edges of the V-slot. Thus, the edges may be conveniently 90 degree edges. It may be possible that the angle is less but the edges should not be so sharp as to exert any cutting effect on the rope. The mouth of the V should be wide enough to comfortably to receive the rope thereinto and the apex of the V should be sharp enough that the deeper portions of the V grip the rope firmly.

The unitary body of the slide may be of any convenient shape but is suitably dimensioned and contoured so that it fits comfortably into the hand. The slide 12 may be utilized with many varieties of rope but is particularly suitable for use with soft ropes such as nylon rope.

The embodiment illustrated in FIGS. 1 to 5 is capable only of acting as a slip knot and adjustment of the length of the tyer is only by choice of length of the end portion 36 latched into keyhole channel 42. If it is desired to form a noose which does not reduce in size to tighten around a post when tension is applied to it, other of the following embodiments may be utilized.

FIGS. 6 to 11 illustrate one embodiment of a tyer in which the noose is lockable to a set length under tension. In FIGS. 6 to 11 a rope 110 is configured in a slide 112. An upstream run 111 of rope enters a first tube portion 116 running longitudinally through slide 112 from upstream end 122 to downstream end 126 of first tube portion 116. A downstream length 124 emerges from downstream end 126 of first tube portion 116 and is looped back on itself to form first bight 134 and return run 128. First bight 114 may loop around post 146.

First tube portion 116 is connected to a surface of slide 112 by means of longitudinal slot 117. Slot 117 has a width sufficient to allow an exposed run 119 of rope to be pulled outwardly of slot 117 to form a jamming bight 121 of rope 110.

The return run 128 of rope 110 is threaded between jamming bight 121 and the surface of slide 112. A mid portion 134 is then bent back on itself to run in the same direction as upstream run 111 of rope 110 to form a further bight 138. A V-shape slot 140 is provided and is located and dimensioned to receive bight 138 when tension is applied to rope 110 to draw bight 138 towards the V-shape slot 140.

Mid-portion 134 of rope 110 may be latched into keyhole slot 142 which runs parallel to first tube portion 116. The location of keyhole slot 142 is such as to position bight 138 properly for entry into V-shaped slot 140. Keyhole slot 142 has a longitudinal mouth 144 through which mid portion 134 may be pressed to latch it into the slot 142. The purpose and operation of keyhole slot 144 are similar to the purpose and operation of keyhole slot 142 described above.

When jamming bight 121 is withdrawn from slot 117 so that return run 128 is threaded loosely through it (see FIG. 7), the bight 114 forms an adjustable noose about post 146. Tension in the direction of arrow B acting on loose bight 114 will allow the bight to tighten. Similarly if upstream run 111 of rope 110 is loose tension on downstream length 124 of bight 114 will allow bight 114 to lengthen by drawing more rope through first tube portion 116.

Figure 8:
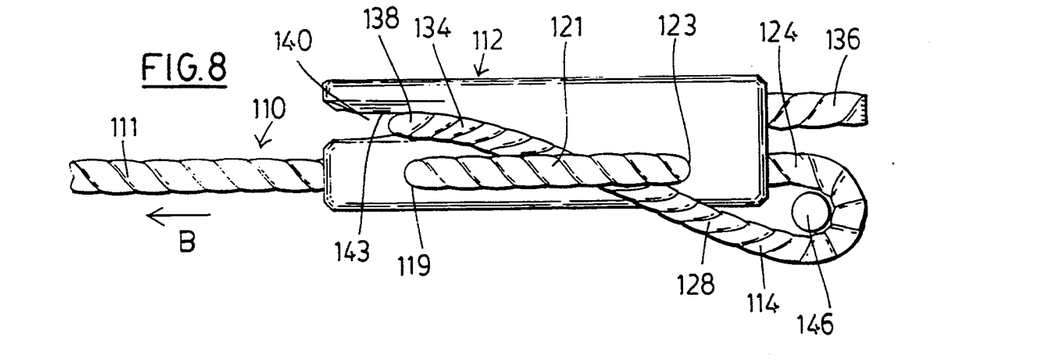
FIG. 8 is a view similar to that of FIG. 7 but with the tyer in tensioned condition.

If, however, tension exists in upstream run 111 and in downstream length 124 the Samming bight 121 will be taughtened and forced back towards its original position in first tube portion 116 (see FIG. 8). It will, however, not be possible for it to fully return to this position since it is jammed against return run 128 of rope 110. As bight 121 is forced towards position in first tube portion 116 it will become wedged between the edges of the slot 117 and return run 128. In fact it will attempt to force a portion of return run 128 into slot 117. This wedging effect becomes progressively greater as tension increases. Eventually it may become impossible to change the size of bight 114 without releasing tension.

In operation the device may operate in the following manner. The rope 110 is threaded into the slide 112 in the above described configuration. Bight 114 is placed about post 146 or other fixed object and an upstream end of rope 110 is attached to another object. One or both of the posts 146 and the other object may be moveable. For the sake of simplicity of description it will be assumed that post 146 is fixed and the other object (not shown) is moveable. The length of the tyer is adjusted in a manner to be hereinafter described and the moveable object is allowed to exert tension on the rope 110. As tension increases on rope 110 in the direction of arrow B, it will be transmitted to bight 114 through the upstream run 111 of rope 110 and bight 121. As tension in bight 134 increases it will be further transmitted to the return run 128 and thereby to bight 138 which will be urged into the mouth of V slot 140. As tension increases, bight 138 will be more strongly urged into V-slot 140 and will progressively move into a narrower portion of V slot 140 and will be progressively more firmly clamped therein. Additionally, bight 121 will tighten into the position shown in FIG. 8 so that it is wedged between the return run 128 of 110 and the end portion 123 of slot 117. The wedging of bight 121 inhibits its sliding in tube portion 116 and the length of bight 114 is thus fixed.

V-slot 140 may be formed in any convenient manner but it conveniently has relatively sharp inner edges suitable for gripping rope 110. The considerations in forming V-slot 140 are similar to those in forming V slot 40 as discussed above. However, V-slot 140 in slide 112 is not formed by diagonal fingers as in slide body 12 but is cut into the main body of the slide 112 and has inner bevelled edges 143. Adjustment of the length of the tyer of FIGS. 6 to 8 may be made in two different manners as are shown in FIGS. 9 and 10.

Figure 9:
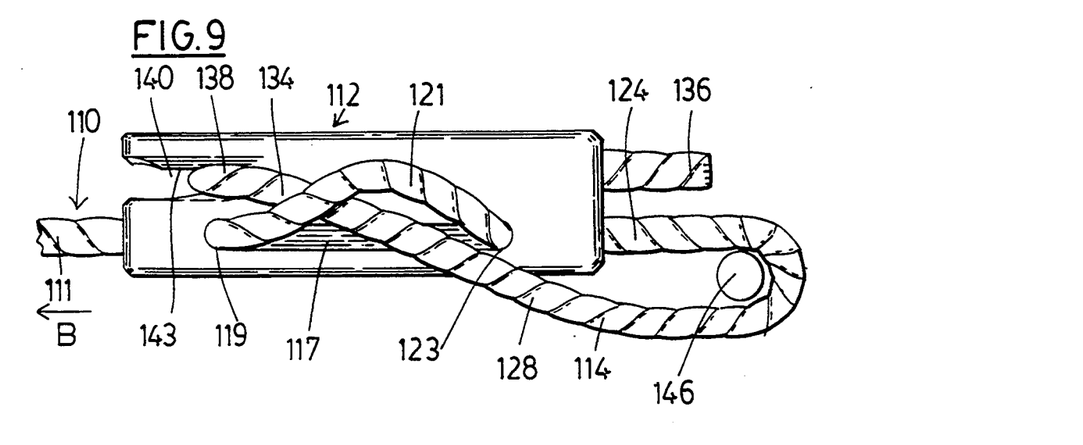
FIG. 9 is a view of the embodiment of FIG. 7 having had its length adjusted in one manner.

One manner of shortening the overall length of the tyer which may be appreciated from FIG. 9, is by loosening tension on rope 110 and by pulling a length of rope downstream through first tubular portion 116. This increases the length of bight 114 and decreases any available length of rope upstream of slide 112. The effective length of bight 114 as regarded as a portion of tyer length is, however, half the actual length of rope contained in it. Thus, increasing the length of rope in bight 114 decreases the total effective length of the tyer. Once the tyer has been adjusted to the desired length, tension is allowed to come on rope 110 which forces bight 121 back towards its location in first tube portion 116 and jams it and return run 128 against further sliding as has been described.

Figure 10:
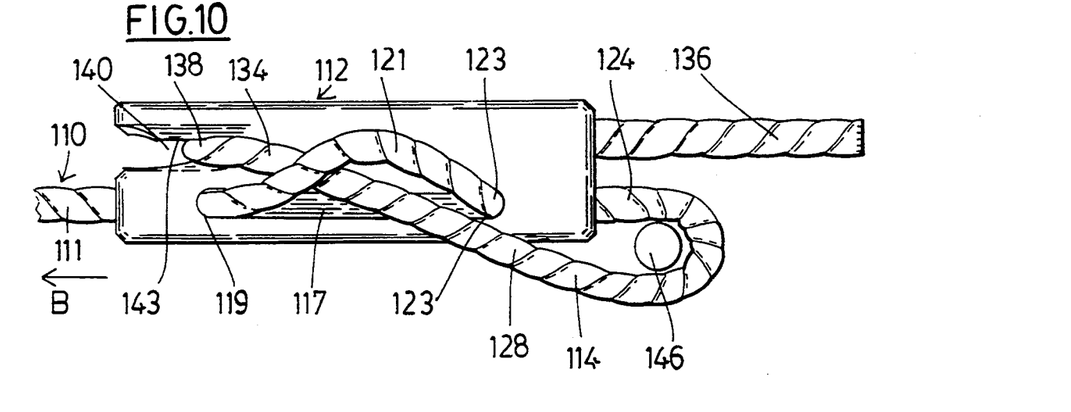
FIG. 10 is a view of the embodiment of the tyer of FIG. 7 having had its length adjusted in another manner.
Figure 11:
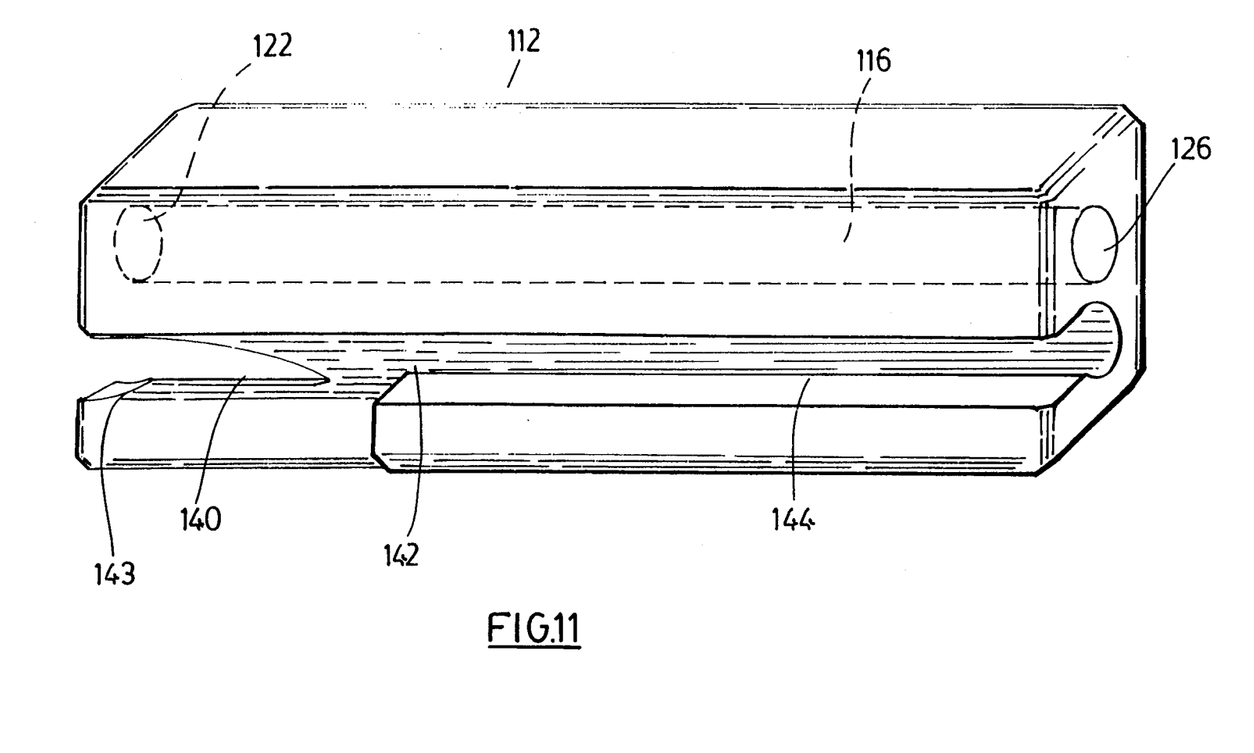
FIG. 11 is a perspective view of the slide (without rope) of FIGS. 7-10.

Another method of adjusting the length of the tyer may be appreciated from FIG. 10. This method is very similar to that described in relation to the tyer of FIGS. 1 to 5. Therefore it will not be described in detail in connection with this embodiment. It may be sufficient to say that rope 110 is adjusted in slide 112 until the end portion 136 is of such a length to adjust the effective length of the tyer upstream of V slot 140 to that which is desired.

Figure 12:
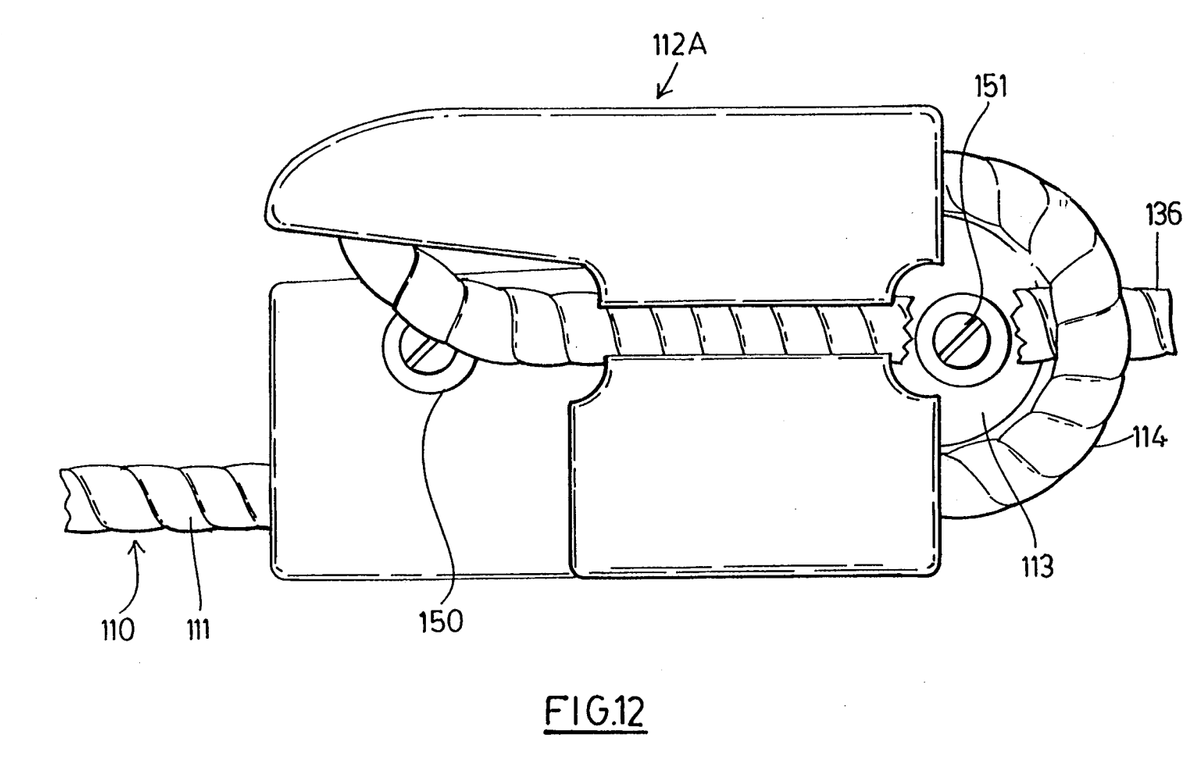
FIG. 12 is a view of a modified embodiment of FIGS. 6-10.

FIG. 12 shows a modified slide 112A having a rope 110 configured in it in a similar manner to the embodiment of FIGS. 1 to 5.

Figure 13:
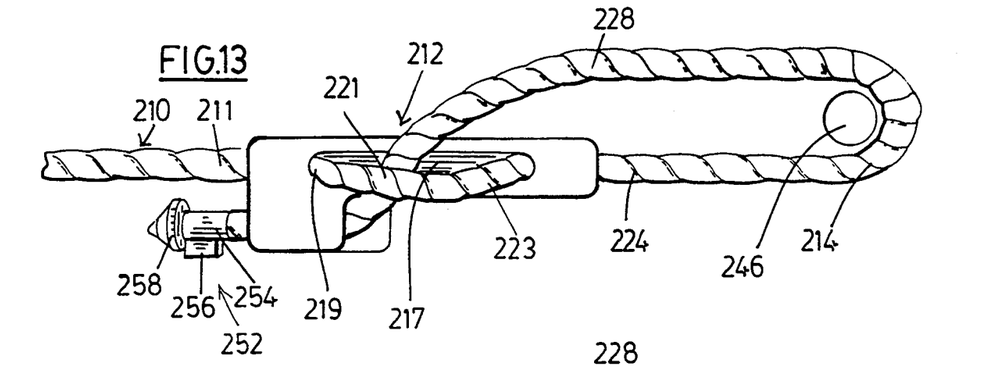
FIG. 13 is a view of an embodiment of another tyer according to the invention in untensioned condition.
Figure 14:
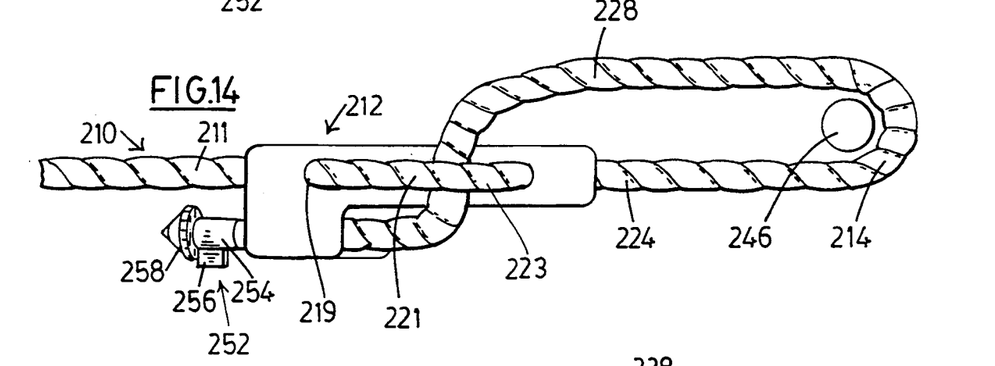
FIG. 14 is a view of the tyer of FIG. 13 in tensioned condition.
Figure 15:
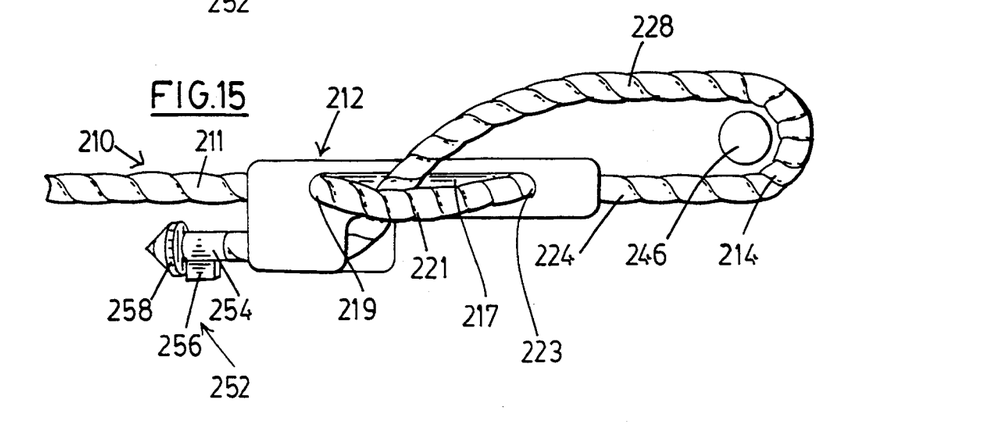
FIG. 15 is a view of the tyer of FIG. 13 having had its length adjusted.

The slide of FIG. 15 differs from the embodiment of FIGS. 12 to 14 in that bolts 150, 151 are provided through slide body 112A to allow it to be bolted down. Slide 112A has an extension 113 for location of a hole for bolt 15. End portion 136 is shown broken away in order to allow view of the head of one of the bolts 150, 151 below it. Moreover, end portion 136 is shown slotted through bight 114 for extra security. It may be desirable to locate bolt 151 to pass through end portion 136 for even greater security.

FIGS. 13 to 16 illustrate another embodiment of a tyer in which the noose is lockable to a set length under tension. In FIGS. 13 to 16 a rope 210 is configured in a slide 212. An upstream run 211 of rope enters a first tube portion 216 running longitudinally through slide 212 from upstream end 222 to downstream end 226 of first tube portion 216. A downstream length 224 emerges from downstream end 226 of first tube portion 216 and is looped back on itself to form first bight 214 and return run 228. First bight 214 may loop around post 246.

First tube portion 216 is connected to a surface of slide 212 by means of longitudinal slot 217. Slot 217 has a width sufficient to allow an exposed run 219 of rope to be pulled outwardly of slot 217 to form a jamming bight 221 of rope 210.

An end portion 236 of return run 228 of rope 210 is threaded between Samming bight 221 and the surface of slide 212, and, thereafter, through a keyhole slot 242 running parallel with tubular portion 216. Keyhole slot 242 has a longitudinal mouth 244 through which end portion 236 may be pressed to latch it into the slot 242.

Figure 16:
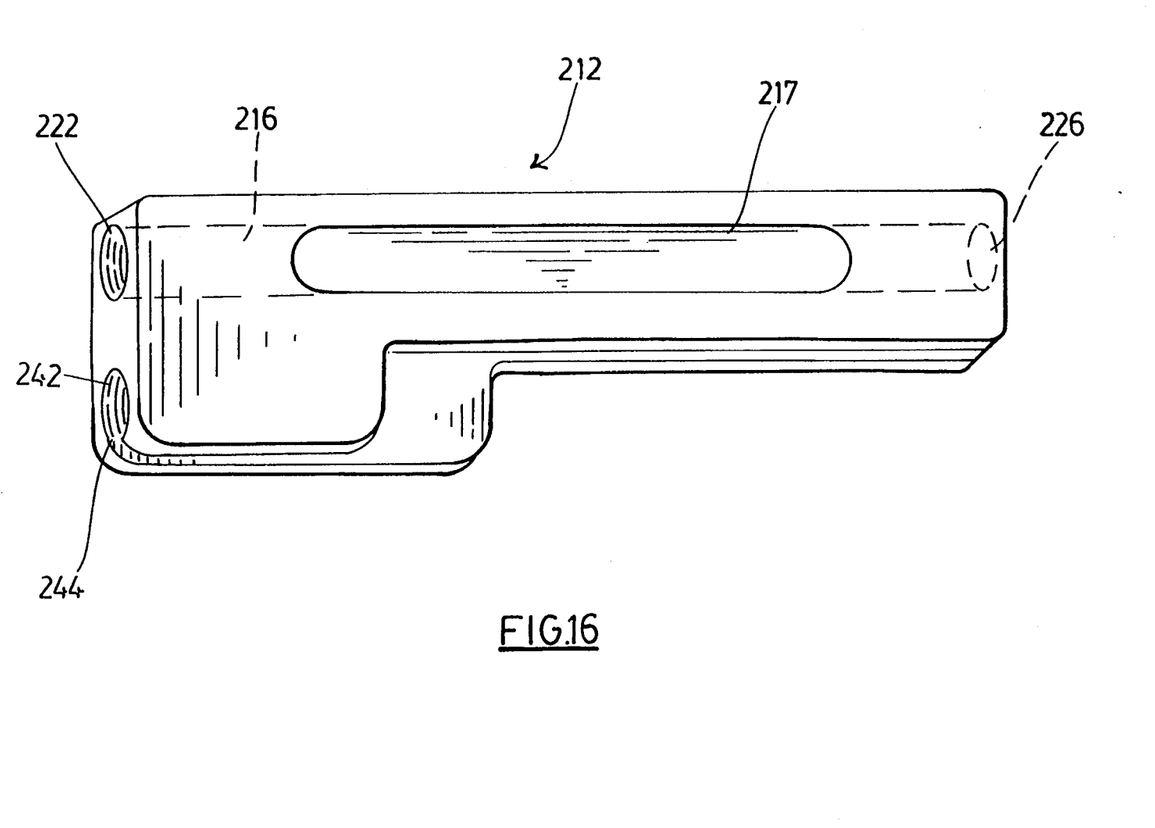
FIG. 16 is a perspective view of the slide including rope stop end of FIGS. 13-15.

End portion 236 ends with a rigid key plug 252 having a shaft 254 which runs in keyhole slot 242 and a key portion 256 which fits mouth 244 of slot 242. While it is possible to press fit soft, compressible rope into keyhole slot 242 through mouth 244, it is not possible to force rigid plug 252 out of the slot 242 in the same manner due to the diameter of shaft 256 which is greater than the width of mouth 244. Plug 252 must enter 242 at a downstream end 245 and exit in the same manner. Plug 252 includes a rim stop 258 which precludes drawing plug 252 completely through slot 242.

Plug 252 is illustrated as located downstream of slot 242 so that details of its structure may be seen. It will be appreciated that, in operation, plug 252 will be lodged in slot 242.

When the rope 210 is formed of nylon or other thermoplastic material, plug 252 may be molded directly from the material of the rope itself.

When jamming bight 221 is withdrawn from slot 217 so that return run 228 is threaded loosely through it (see FIG. 16), the bight 214 forms an adjustable noose about post 246. Tension in the direction of arrow C acting on loose bight 214 will allow the bight to shorten. Similarly if upstream run 211 of rope 210 is loose, tension on downstream length 224 of bight 214 will allow bight 214 to lengthen by drawing more rope through first tube portion 216.

Figure 17:
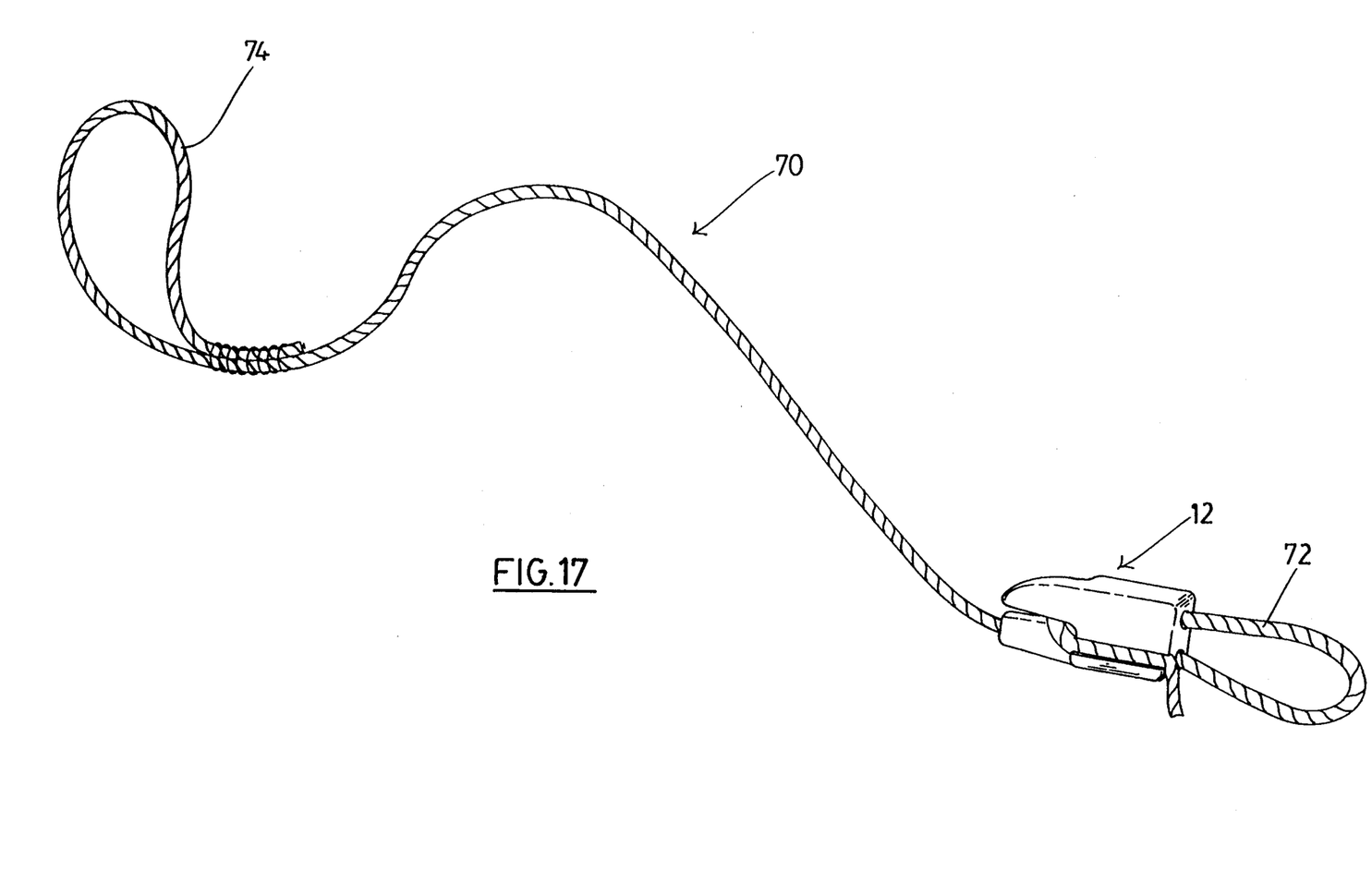
FIG. 17 shows a schematic view of a complete tyer according to the invention.

If, however, tension exists in upstream run 211 and in downstream length 224 the jamming bight 221 will be taughtened and forced back towards its original position in first tube portion 216 (see FIG. 17). It will, however, not be possible for it to fully return to this position since it is jammed against return run 228 of rope 210. As bight 221 is forced towards position in first tube portion 216 it will become wedged between the edges of the slot 217 and return run 228. In fact it will attempt to force a portion of return run 228 into slot 217 and will drag it towards a downstream slot end 219. This wedging effect becomes progressively greater as tension increases. Eventually it may become impossible to change the size of bight 214 without releasing tension.

In operation the device may operate in the following manner. The rope 210 is threaded into the slide 212 in the above described configuration. Bight 214 is placed about post 246 or other fixed object and an upstream end of rope 210 is attached to another object. One or both of the posts 246 and the other object may be moveable. For the sake of simplicity of description it will be assumed that post 246 is fixed and the other object (not shown) is moveable. The length of the tyer is adjusted in a manner to be hereinafter described and the moveable object is allowed to exert tension on the rope 210. As tension increases on rope 210 in the direction of arrow C, it will be transmitted to bight 214 through the upstream run 211 of rope 210 and bight 221. Bight 221 will tighten into the position shown in FIG. 17 so that it is wedged between the return run 228 of 210 and the end portion 219 of slot 217. The wedging of bight 221 inhibits its sliding in tube portion 216 and the length of bight 214 is thus fixed.

Adjustment of the length of the tyer of FIGS. 13 to 16 may be made as is shown in FIG. 16.

Shortening the overall length of the tyer which may be appreciated from FIG. 16, is by loosening tension on rope 210 and by pulling a length of rope downstream through first tubular portion 216. This increases the length of bight 214 and decreases any available length of rope upstream of slide 212. The effective length of bight 214 as regarded as a portion of tyer length is, however, half the actual length of rope contained in it. Thus, increasing the length of rope in bight 214 decreases the total effective length of the tyer. Once the tyer has been adjusted to the desired length, tension is allowed to come on rope 210 which forces bight 221 back towards its location in first tube portion 216 and jams it and return run 228 against further sliding as has been described.

FIG. 16 shows a schematic view of an adjustable tyer according to the invention. As shown the tyer 70 has a loop 72 at one end and a loop 74 at the other end. The loop 72 may be formed through the use of a slide 12, 112 or 212 as described with reference to the specific exemplary embodiments hereinbefore discussed. The length of the tyer may be adjustable as described with reference to the configuration of rope in any of the described slides. The loop 74 at the other end of the rope may be a fixed loop as illustrated or may be provided by means of a second slide 12, 112 or 212. If a second slide is provided adjustment may be from either end of the rope.

I claim:

1. An adjustable tyer comprising
   a flexible rope;
   a slide adjustably positionable with respect to the rode to adjust the effective rope length;
   the slide comprising a unitary body having a first tube portion through which the rope passes in one direction in a freely slidable manner, an upstream portion of the rope leading into an upstream end of the first tube portion and a downstream first bight emerging from a downstream end of the first tube whereby the length of the first bight is freely adjustable;
   a clamp means acting on a returning length of said first bight;
   a second tube portion rope guide parallel to the first tube portion, the returning downstream length of the first bight passing through the second tube portion in the opposite direction to said one direction upstream of the clamp means;
   a quick release holding means for a downstream end portion of the rope downstream of the clamp means, the quick release holding means comprising a longitudinal channel parallel to the first and second tube portions and having a longitudinal channel parallel to the first and second tube portions and having a longitudinal mouth for removable insertion of an upstream length of said downstream end portion of the rope tightly thereinto; and
   a second bight of rope between the rope guide and the holding means, the clamp means acting on the second bight of rope.

2. A tyer as claimed in claim 1 in which said upstream length passes through the longitudinal channel in said one direction.

3. A tyer as claimed in claim 1 in which the clamp means is a V shaped slot located between the longitudinal channel and the second tube portion to engage the second bight and progressively wedge it in the V on a tensioning of the upstream portion of the rope.

4. A tyer as claimed in claim 1 in which releasable jamming means are provided to inhibit sliding of the rope in the first tube whereby the length of the bight is settable.

5. A tyer as claimed in claim 4 in which the jamming means comprises a longitudinal slot opening into said first tubular portion, a third bight of rope extending slightly from said slot, and said returning downstream length of the first bight, passing between the slide body and the third bight, whereby tightening of the third bight jams the rope against sliding in the first tube portion.

6. A tyer as claimed in claim 5 in which the holding means comprises a elongate channel parallel to the first tube portion and having a longitudinal mouth for removable insertion of an upstream length of said end portion of the rope tightly thereinto.

7. A tyer as claimed in claim 5 in which the clamp means is a V shaped slot, the apex of the V pointing in said one direction, located between the jamming means and the longitudinal channel to engage the second bight and progressively wedge it in the V on tensioning of the first bight.

* * * * *